(12) United States Patent
Ridgway

(10) Patent No.: US 8,373,921 B2
(45) Date of Patent: Feb. 12, 2013

(54) METHODS AND SYSTEMS FOR MODULATING AND DEMODULATING MILLIMETER-WAVE SIGNALS

(75) Inventor: Richard W. Ridgway, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 155 days.

(21) Appl. No.: 13/003,799

(22) PCT Filed: Aug. 13, 2009

(86) PCT No.: PCT/US2009/053702
§ 371 (c)(1),
(2), (4) Date: Jan. 12, 2011

(87) PCT Pub. No.: WO2010/019765
PCT Pub. Date: Feb. 18, 2010

(65) Prior Publication Data
US 2011/0122477 A1    May 26, 2011

Related U.S. Application Data

(60) Provisional application No. 61/088,902, filed on Aug. 14, 2008.

(51) Int. Cl.
*G02F 1/01* (2006.01)
*H04B 10/04* (2006.01)
(52) U.S. Cl. ........ 359/279; 359/325; 398/115; 398/118; 398/188
(58) Field of Classification Search .................. 359/239, 359/245, 276, 278, 279, 325; 398/45, 49, 398/115, 118, 152, 183, 187, 188, 201; 385/2, 385/3, 8, 10, 24, 37; 725/67
See application file for complete search history.

(56) References Cited

U.S. PATENT DOCUMENTS

| | | | |
|---|---|---|---|
| 6,278,813 B1 * | 8/2001 | Takada et al. | 385/24 |
| 6,400,864 B1 * | 6/2002 | Lee | 385/24 |
| 6,853,758 B2 | 2/2005 | Ridgway et al. | |
| 7,123,793 B2 | 10/2006 | Ridgway | |

(Continued)

FOREIGN PATENT DOCUMENTS

| EP | 1 760 913 A1 | 3/2007 |
|---|---|---|
| WO | 2008/060715 A1 | 5/2008 |

OTHER PUBLICATIONS

Kikuchi, "Intersymbol Interference (ISI) Suppression Technique for Optical Binary and Multilevel Signal Generation", Journal of Lighwave Technology, vol. 25, No. 8, Aug. 2007.

(Continued)

*Primary Examiner* — Loha Ben
(74) *Attorney, Agent, or Firm* — Dinsmore & Shohl LLP

(57) ABSTRACT

A system comprises an optical processor comprising a sideband generator, an optical filter, and a phase-shift-keying (PSK) modulator, wherein: the sideband generator generates optical frequency sidebands about a carrier frequency of an optical signal; the optical filter discriminates between the optical frequency sidebands and the optical carrier frequency such that optical sidebands of interest can be used to generate an optical millimeter-wave signal; the PSK modulator comprises an optical splitter, an optical phase delay unit, two or more optical gates, and an optical combiner; the optical splitter divides the optical millimeter-wave signal into two or more intermediate signals; the optical phase delay unit delays one or more of the intermediate signals to create distinct phase relationship between them; the optical gates modulate each intermediate signal individually, based on a control input; and the optical combiner combines the gated intermediate signals into a single, PSK-modulated optical millimeter-wave signal.

17 Claims, 3 Drawing Sheets

U.S. PATENT DOCUMENTS

| | | | |
|---|---|---|---|
| 7,783,199 B2 * | 8/2010 | Ridgway et al. | 398/115 |
| 8,098,185 B2 * | 1/2012 | Ridgway et al. | 342/22 |
| 2008/0199124 A1 | 8/2008 | Nagatsuma et al. | |
| 2010/0263001 A1 * | 10/2010 | Nippa et al. | 725/67 |
| 2011/0038640 A1 * | 2/2011 | Ridgway | 398/188 |

OTHER PUBLICATIONS

International Search Report and Written Opinion for PCT/US2009/053702 dated Nov. 3, 2009.

* cited by examiner

METHODS AND SYSTEMS FOR MODULATING AND DEMODULATING MILLIMETER-WAVE SIGNALS

CROSS-REFERENCE TO RELATED APPLICATIONS

This application is a U.S. national phase entry of International Application No. PCT/US2009/053702, filed Aug. 13, 2009, which claims the benefit of U.S. Provisional Application Ser. No. 60/088,902 filed Aug. 14, 2008.

The present disclosure relates to methods and systems for modulating and demodulating millimeter-wave signals. More specifically, this disclosure involves photonic devices operable to modulate optical millimeter-wave signals and electrical devices operable to demodulate electrical millimeter-wave signals.

By way of illustration, not limitation, there is a growing interest in the generation and modulation of high frequency signals. For example, the present inventors have contemplated that signals in the THz spectrum (0.1 to 10 THz) may find significant utility in imaging and wireless applications. For imaging, the THz spectrum may provide high resolution imaging through walls, cargo containers, and other visible barriers. It is contemplated that modulation onto these high frequency signals can provide improved resolution and the ability to separate a desired target from clutter. For wireless data communications, it is contemplated that the THz spectrum may allow ultra high data transfer (10 Gb/s) for transmission of uncompressed high definition television channels. Other uses of the THz spectrum are contemplated, including those yet to be discovered. However, significant design challenges face those who endeavor to design systems for the generation and modulation of coherent THz and other high frequency signals.

For example, millimeter-wave carrier frequencies (30 GHz to 300 GHz) provide a promising approach for achieving high data rates. Commercial millimeter-wave systems operating at 70 GHz have demonstrated data links at rates of 1 Gb/s. These data rates are not as high as would be expected at this carrier frequency because millimeter-wave sources have not traditionally been directly modulated; instead the modulation occurs at a lower intermediate frequency. The data rate is generally limited to about 10 percent on the intermediate frequency (typically 11 GHz) to about 1 Gb/s.

Optical approaches for generating and modulating millimeter-wave signals, such as those presented in published patent application US 2008/0199124 A1, carry out modulation on an optical carrier, which can easily handle data rates in excess of 10 Gb/s. To date, these optical approaches have used on-off keying modulation schemes. However, on-off keying modulation is not spectrally efficient and consumes a bandwidth of about 1 Hz for each bit/second of data rate. For example, 10 Gb/s (Gigabits/second) wireless data rates for millimeter-wave carriers around 100 GHz typically occupy a bandwidth of 10 GHz.

The present disclosure relates to the use of an electrooptic modulator to provide phase and/or amplitude modulation onto a millimeter-wave carrier in an effort to increase spectral efficiency of digital data transmission. Phase modulation techniques, such as quadrature phase shift keying, can be shown to be spectrally efficient, with a spectrally efficiency of 2, i.e., 1 Hz of bandwidth will contain 2 bits/second of data. The combination of phase and amplitude modulation techniques, such as quadrature amplitude modulation (QAM), can provide even more spectral efficiency.

The present disclosure shows that a photonic approach to generating and modulating millimeter-waves can be used to control both the amplitude and phase of the millimeter wave. This will lead to the ability to provide high-order phase modulation and QAM, both of which are spectrally efficient. A spectrally efficient modulation scheme will consume less bandwidth than a standard on-off keying modulation approach.

A typical rule of thumb suggests that a carrier frequency can employ 10 percent of its bandwidth for data. In other words, a 10 GHz carrier can be used to transmit data at 1 Gb/s a 100 GHz carrier can be used to transmit data at 10 Gb/s, and so forth. Spectrally efficient coding allows more bits to fit within the allowable bandwidth. As an example, quadrature-phase shift keying (QPSK), which has a spectral efficiency of 2 bits/second per hertz, can encode 20 Gb/s within the 10 GHz bandwidth. More efficient coding methods, such as quadrature amplitude modulation (QAM), can provide higher data rates within the same bandwidth.

In addition to generating modulated millimeter-wave signals, it is also desired to demodulate such signals upon reception in order to recover the encoded data contained therein. Many receivers designed to demodulate phase-shift-keying-modulated (PSK-modulated) millimeter-wave signals often employ a phase-locked loop (PLL) circuit which synthesizes and "locks" onto the carrier frequency such that the phase of the modulated millimeter-wave signal can be detected. However, designing a PLL at millimeter-wave frequencies (e.g., 70 GHz) can be difficult and relatively expensive. Thus, there is a need for a receiver design which does not require a PLL and is capable of demodulating a phase-modulated millimeter-wave signal.

In accordance with one embodiment of the present disclosure, a system comprises an optical processor, wherein: the optical processor comprises a sideband generator, an optical filter, and a phase-shift-keying (PSK) modulator; the sideband generator is configured to generate optical frequency sidebands about a carrier frequency of an optical signal; the optical filter is configured to discriminate between the optical frequency sidebands and the optical carrier frequency such that optical sidebands of interest can be used to generate an optical millimeter-wave signal; the PSK modulator comprises an optical splitter, an optical phase delay unit, two or more optical gates, and an optical combiner; the optical splitter is configured to divide the optical millimeter-wave signal into two or more intermediate signals; the optical phase delay unit is configured to delay one or more of the intermediate signals such that each intermediate signal has a distinct phase relationship relative to the remaining intermediate signals; the optical gates are configured to modulate each intermediate signal individually between a relatively high amplitude and a relatively low amplitude based on a control input; and the optical combiner is configured to combine the gated intermediate signals into a single, PSK-modulated optical millimeter-wave signal.

In accordance with another embodiment of the present disclosure, a receiver for demodulating a PSK-modulated electrical millimeter-wave signal $A_0$ comprises a signal conditioning module, a phase-shifting module, and a discriminator module, wherein: the signal conditioning module receives the electrical millimeter-wave signal $A_0$ and generates a delayed millimeter-wave signal $B_0$, such that the delay corresponds to a symbol delay of data encoded in the millimeter-wave signal; the phase-shifting module shifts the phase of the millimeter-wave signal $A_0$ so as to produce a phase-shifted millimeter-wave signal $A_1$; the phase-shifting module shifts the phase of the delayed millimeter-wave signal $B_0$ so as to produce a phase-shifted, delayed millimeter-wave signal $B_1$; and the discriminator module compares the phases of $A_0$ and $B_1$ and compares the phases of $B_0$ and $A_1$ and, based on the two comparisons, generates four outputs, each output being associated with one of the phases of the millimeter-wave signal such that the relative amplitudes of the outputs correspond to the phase of $A_0$ relative to the phase of $B_0$.

In accordance with yet another embodiment of the present disclosure, a method of transmitting data by a millimeter-wave signal comprises: generating optical frequency sidebands about a carrier frequency of an optical signal; discriminating between the optical frequency sidebands and the optical carrier frequency to generate an optical millimeter-wave signal; splitting the optical millimeter-wave signal into two or more intermediate signals; delaying one or more of the intermediate signals such that each intermediate signal has a distinct phase relationship to the remaining intermediate signals; and modulating the intermediate signals such that one of the intermediate signals has relatively high amplitude and the remaining intermediate signals have a relatively low amplitude, based on a control input; recombining the intermediate signals into a single, phase-modulated optical millimeter-wave signal.

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

The embodiments described herein generally relate to methods and systems for modulating and demodulating millimeter-wave signals. A photonic device may be used to modulate the phase and/or amplitude of an optical millimeter-wave (MMW) signal. A receiver comprising a signal conditioning module, a delay module, and a discriminator module may be used to demodulate an electrical MMW signal. Note that "optical MMW signals" are MMW signals in the optical domain, while "electrical MMW signals" are MMW signals in the electrical or electro-magnetic domain.

Photonic methods and systems may be used for modulating data in MMW communications. For example, a photonic device may be operable to modulate the phase of an optical MMW signal such that it is encoded with information representing a digital data input. The optical MMW signal may be modulated in amplitude as well. After modulation, the optical MMW signal may be converted to an electrical signal and wireless sly transmitted by an antenna to a corresponding receiver. In another embodiment, the receiver may receive the modulated wireless signal, convert it to an electrical signal, and demodulate it such that the digital data encoded in the modulated electrical MMW signal is recovered.

Figure 1:
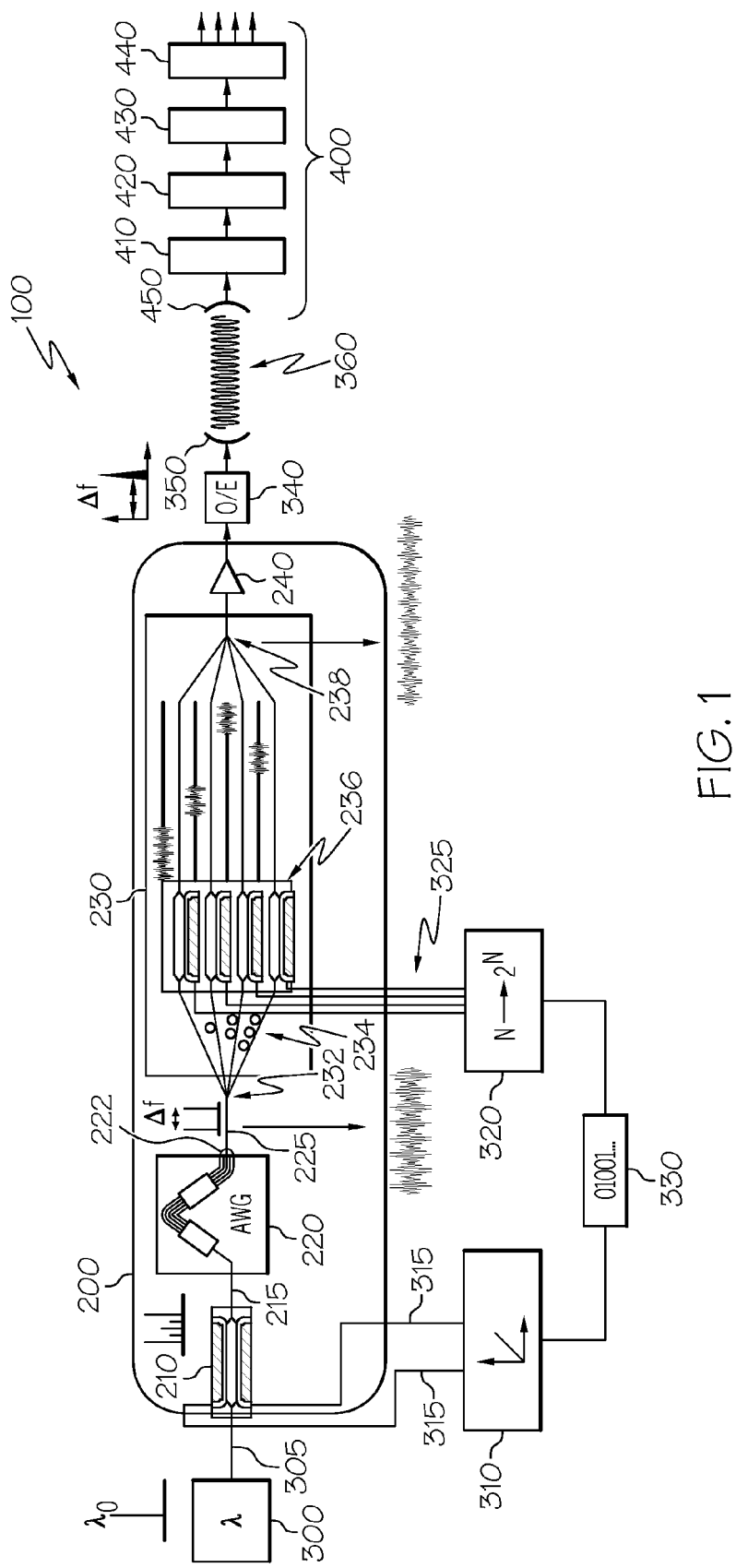
FIG. 1 is a schematic illustration of a system according to one embodiment of the present disclosure.

FIG. 1 illustrates one embodiment of a system 100 which is capable of modulating and/or demodulating a MMW signal. With regard to modulating the MMW signal, the system 100 may comprise an optical processor 200. The optical processor 200 may comprise a photonic device in which optical signals are manipulated in order to generate a modulated optical MMW signal. The system may further comprise an output/electrical (O/E) converter 340 which may be operable to convert the modulated optical MMW signal into a modulated electrical MMW signal. The system may additionally comprise a transmitting antenna 350 which may convert the modulated electrical MMW signal into a wireless MMW signal 360. The system may also comprise a receiver 400 which may receive the wireless MMW signal and demodulate it such that any data encoded in the signal may be recovered.

The optical processor 200 of FIG. 1 may comprise a sideband generator 210, an optical filter 220, and a phase-shift-keying (PSK) modulator 230. Generally, the optical processor 200 may include a combination of waveguides and optical fibers that are configured to direct optical signals throughout the processor. Specifically, the optical processor 200 may be configured to direct the optical carrier and associated sidebands from the laser source 300 to the sideband generator 210, optical filter 220, and PSK modulator 230.

The sideband generator 210 may be configured as an electrooptic interferometer. More specifically, it may be configured as a Mach-Zehnder interferometer where an optical signals propagating in the input segment of the interferometer is divided into two equal parts at, for example, a Y-splitter. The two optical signals propagate down the two arms of the interferometer before being recombined with, for example, a Y-combiner. If the two optical signals are in phase at the Y-combiner, the signals constructively interfere and the full intensity propagates out the output waveguide. If, however, the two optical signals are out of phase, then the signals destructively interfere and the output intensity is reduced. If the signals at the Y-combiner are out of phase by $\pi$ radians, then the two signals may destructively interfere and the output may be at a minimum.

An amplitude controller 310 may be configured to generate an electrical drive signal 315 to drive the sideband generator 210 in order to adjust the amplitude of the optical frequency sidebands and, ultimately, the optical millimeter-wave signal to be modulated. The level of the electrical drive signal 315 may determine these amplitudes. For example, if the sideband generator 210 is driven with a relatively low voltage, then the amplitude of the harmonics may be quite low. However, as drive voltage increases, the magnitude of the harmonics may become larger than the fundamental.

In one embodiment, the amplitude controller 310 may apply an electrical drive signal 315 of relatively constant voltage in order to cause the sideband generator 210 to generate optical frequency sidebands of interest. In this embodiment, the system 100 may only modulate the phase of the optical MMW signal. In an alternative embodiment, the amplitude controller 310 may apply an electrical drive signal 315 having two or more voltage levels. This may cause the amplitude of the optical MMW signal to vary between two or more distinct states. In this fashion, the amplitude controller 310 may be operable to modulate the amplitude of the optical MMW signal.

As an example of a sideband generator 210, if a 1550 nm optical signal is modulated at 12 GHz, the fundamental modulation frequency and any harmonics may be present as sidebands on the optical carrier at +/−0.08 nm from the 1550 nm carrier. Thus, the dominant sidebands may be at 1549.52 nm and 1550.48 nm. In the frequency domain, these wavelengths correspond to 193,608.4 GHz and 193,488.4 GHz, respectively. The difference between these two frequencies is 120 GHz. This corresponds to the $5^{th}$ harmonic of the 12 GHz modulation frequency (i.e. ±5*12 GHz or ±60 GHz). It is contemplated that the sidebands of interest need not dominate the optical signal output from the sideband generator 210.

Rather, in many embodiments of the present disclosure, it may be sufficient to merely ensure that the magnitude of the frequency sidebands of interest, at an output of the sideband generator, is at least about 10% of a magnitude of the optical carrier signal at the optical input of the optical filter.

Continuing to refer to FIG. 1, the optical filter 220 is configured to select the desired sidebands and remove the carrier frequency and any unwanted sidebands. This optical filtering function can be accomplished using a variety of technologies, including Bragg grating reflective filters, wavelength-selective Mach-Zehnder filters, multilayer thin film optical filters, arrayed waveguide gratings (AWG), micro ring resonator filters, and directional coupler filters that are wavelength selective. An arrayed waveguide grating is particularly useful because it is an integrated optical device with multiple channels characterized by very narrow bandwidths. The following discussion focuses on the use of an AWG, although other filters can also be used in accordance with the present invention.

The role of the AWG is to filter out the undesirable sidebands and, with the cooperation of a signal combiner (not shown), combine the two sidebands of interest. For example, an AWG with a channel spacing of 60 GHz ($\Delta\lambda$=0.48 nm) or a channel spacing of 30 GHz ($\Delta\lambda$=0.24 nm) would be well-suited for a 120 GHz system. Each of the sidebands may come out of a separate output channel of the optical filter 220 according to its characteristic wavelength. By way of illustration, not limitation, if the output of the sideband generator 210 is inserted into the AWG, then the two desired $5^{th}$ order harmonics may come out of two ports relatively far apart. If, however, a 60 GHz AWG is used, the desired $5^{th}$ order sidebands would come out less displaced but still distinct ports. One advantage of the 30 GHz AWG is that the port bandwidths are much narrower. However, 30 GHz AWGs are often more difficult to produce and operate. For these reasons, it may be preferable to operate some embodiments of the present invention by utilizing a 60 GHz AWG as the optical filter 220.

The optical filter 220 may comprise a sideband combiner 222 which may be configured to combine the filtered sidebands into a single, optical MMW signal 225. For example if the optical filter 220 produces two sidebands which are spaced apart by 120 GHz, the sideband combiner 222 may operate to combine these signals into a single, optical MMW signal having a fundamental frequency of 120 GHz.

Referring still to FIG. 1, the phase-shift-keying (PSK) modulator 230 may comprise an optical splitter 232, an optical phase delay unit 234, two or more optical gates 236, and an optical combiner 238. The optical splitter 232 may operate to split the optical MMW signal 225 into two or more intermediate signals 231. For example, in a quadrature phase-shift keying (QPSK) system, the splitter may generate four intermediate signals. As another example, in an octal phase-shift keying system (OPSK), the splitter may generate eight intermediate signals. Other numbers of intermediates signals may be generated as well, depending on the requirements of the system.

The optical phase delay unit 234 may delay one or more of the intermediate signals 231 such that each intermediate signal has a distinct phase relationship relative to the remaining intermediate signals. It is possible to delay all but one of the intermediate signals in order to establish the distinct phase relationship. For example in a QPSK system, there may be four intermediate signals, as previously discussed: a first intermediate signal may not be delayed at all; a second intermediate signal may be delayed by $$\frac{\pi}{2}$$

radians (i.e., 90 electrical degrees of the wavelength); a third may be delayed $\pi$ radians; and a fourth may be delayed by $$\frac{3\pi}{2}$$

radians. In this fashion, the four intermediate signals may be $$\frac{\pi}{2}$$

radians (90 electrical degrees) out of phase with respect to each other. In this example, if the optical MMW frequency were 94 GHz, the first intermediate would be delayed 0 picoseconds (ps); the second would be delayed 2.66 ps; the third would be delayed 5.32 ps; and the fourth would be delayed 7.98 ps. Alternatively, all of the intermediate signals may be delayed to achieve the same phase relationship. As another example, in an OPSK system, the eight intermediate signals may be delayed such that they are $$\frac{\pi}{4}$$

radians (45 electrical degrees) out of phase with respect to each other. Other phase relationships may be established as well. The delays for each intermediate signal may be established in the optical processor by varying the length of the optical path for each intermediate signal. Other techniques for establishing the delay may be used as well, such as those known in the art and those yet to be discovered.

Continuing to refer to FIG. 1, the optical gates 236 may be configured to modulate each intermediate signal individually between a relatively high and a relatively low amplitude based on a control input 325. The optical gates 236 may comprise any conventional or yet to be developed device for modulating the intensity of the intermediate optical signals. For example, and not by way of limitation, in the illustrated embodiment, the optical gates 236 are configured as individually controllable electrooptic modulators, such as the modulator array disclosed in U.S. Pat. No. 7,123,793. The gated intermediate signals are designated as relatively high or relatively low because, comparatively, a relatively high intermediate signal has a higher amplitude than a relatively low intermediate signal. This difference in amplitude may be significant enough to permit discrimination between the two signals by the receiver. As an example, a relatively high intermediate signal may have approximately the same amplitude as the intermediate signal before the optical gate, and a relatively low intermediate signal may have an amplitude near zero.

For phase-shift-keying modulation, generally the control input 325 to the optical gates 236 is configured so that no two intermediate signals are concurrently at the relatively high amplitude. For example, when phase modulating a data input signal, each intermediate signal may represent a particular data pattern represented by the data input signal. In a QPSK system, each of the four phases may represent one of the four states of a 2-bit data input signal: 00, 01, 10, and 11. Thus, the control input 325 to the optical gates 236 may be configured so that the appropriate intermediate signal is "gated on" (i.e., made relatively high) and the remaining intermediate signals are "gated off" (i.e., made relatively low). It is to be noted that during the transition time when optical gates are switching their respective intermediate signals the two states, there may be instances when all of the intermediate signals are in the relatively low state or two or more intermediate signals are in the relatively high state. These, however, are transient conditions which may be necessary to insure that the timing of the intermediate signals is suitable for the phase-modulating technique (for example, that the intermediate signals do not overlap when subsequently recombined).

The optical combiner 238 operates to combine the intermediate signals into a single, PSK-modulated optical MMW signal. With regard to the present disclosure, it is contemplated that the optical splitter or optical combiner may use any suitable conventional or yet to be developed structure. For example, suitable alternative structures for splitting and combining optical signals include, but are not limited to, 2×2 directional coupling regions, 1×2 directional coupling regions, 1×2 Y signal splitters and combiners, and 1×2 and 2×2 multimode interference element splitters and combiners. The specific design parameters of these structures are beyond the scope of the present invention and may be gleaned from existing or yet to be developed sources, including U.S. Pat. No. 6,853,758.

The optical processor 200 may further comprise an optical amplifier 240. This may be disposed at the output of the optical combiner 238 since there may be some attenuation of the intermediate signals as they pass through the delay unit, the optical gates, and/or the optical combiner. The optical amplifier 240 may operate to increase the amplitude of the combined intermediate signals, which is called the PSK-modulated optical MMW signal.

Still referring to FIG. 1, the system 100 may further comprise an optical/electrical (O/E) converter 340. The O/E converter may operate to convert the PSK-modulated optical MMW signal into a PSK-modulated electrical MMW signal. Thus, the O/E converter essentially converted the modulated signal from the optical domain to the electrical domain. This may be useful for further processing or transmitting of the signals. The O/E converter 340 may comprise a high speed photodiode, such as a Uni-traveling Carrier (UTC) photodiode, with a 3 dB bandwidth exceeding the millimeter-wave modulation frequency.

The transmitting antenna 350 may operate to transmit the PSK-modulated electrical MMW signal to a signal capable of being wirelessly transmitted to, for example, a receiver 400. The antenna may receive the electrical signal from the O/E converter, for example. The antenna may comprise any suitable technology for transmitting electrical MMW signals, and may direct the wireless signal to a receiver 400 or a detector (not shown).

The system 100 may additionally comprise a laser source 300 which may be optically coupled to the optical processor 200. The laser source 300 may be configured to generate the optical signal 305, which may be directed to the sideband generator 210. The laser source may comprise any suitable technology as is known in the art.

The amplitude controller 310, as discussed herein, may be operable to generate an electrical drive signal to the sideband generator 210 in order to adjust the amplitude of the optical MMW signal. If amplitude modulation is not required by the system, the amplitude controller 310 may generate a drive signal to the sideband generator such that the amplitudes of the optical frequency sidebands are relatively constant. Alternatively, if amplitude modulation is required by the system, the amplitude controller 310 may be operable to adjust the electrical drive signal to the sideband generator such that two or more distinct amplitudes of the optical frequency sidebands are generated. Varying the amplitude of the optical frequency sidebands may be operable to proportionally vary the amplitude of the PSK-modulated optical MMW signal. The amplitude controller 310 may be configured adjust the amplitude based on a data input 330. For example, if the amplitude is modulated between two distinct states, called $S_0$ and $S_1$, the amplitude controller may set the amplitude to $S_0$ when the data input is at a logic "0" and may set the amplitude to $S_1$ when the data input is at a logic "1" state. The amplitude controller 310 may work in conjunction with the PSK modulator 230 so as to generate an optical MMW signal having quadrature amplitude modulation (QAM). Any number of distinct amplitude states is possible, although many digital systems use either two or four states.

The gate generating circuit 320 may be operable to control each of the optical gates 236 of the PSK modulator 230. As discussed herein, for phase-shift keying, generally only one of the intermediate signals is gated to a relatively high state, and the remaining intermediate signals are concurrently gated to a relatively low state. The gate generating circuit 320 may receive a data input 330 and may establish the control input 325 to the optical gates 236 so as to achieve phase-shift keying. For quadrature phase-shift keying modulation scheme, the gate generating circuit 320 may receive a data input comprising two binary digits (bits), each having a logic "0" state and a logic "1" state. In response to the data input, the gate generating circuit may set the control input so that only one of the four intermediate signals is gated to a relatively high state, depending on the bit pattern of the data input. Table 1 below depicts one possible outcome.

TABLE 1

| Bit Pattern | Intermediate Signal Gated On | Phase |
| --- | --- | --- |
| 0, 0 | #1 | 0° |
| 0, 1 | #2 | 90° |
| 1, 0 | #3 | 180° |
| 1, 1 | #4 | 270° |

The gate generating circuit 320 may also generate a control input 325 for the optical gates 236 such that other types of phase-modulated keying may be used. For example, in an octal phase-shift keying (OPSK) scheme, the optical splitter 232 divides the optical MMW signal into eight intermediate signals. The optical phase delay unit 234 may be configured to delay one or more of the intermediate signals such that the intermediate signals are 45 electrical degrees out of phase with respect to the each other. As a result, there may be eight optical gates 236, one associated with each intermediate signal. The gate generating circuit 320 may receive three bits of information (having eight distinct states) and may set the control input so that only one of the eight intermediate signals is gated to a relatively high state, depending on the bit pattern of the data input. Other types of phase-shift-keying modulation may be used as well.

In general, where the data input represents an n-bit code, the PSK modulator 230 and the amplitude controller 310 can be configured to adjust the phase of the electrical drive signal 315 and the control input 325 among $n^2$ available phase and amplitude values corresponding to the bit sequence of the n-bit code. Preferably, the set of $n^2$ available phase and amplitude values is defined by at least $n^2/4$ and as many as $n^2/2$ available phase values and at least $n^2/8$ and as many as $n^2/4$ non-zero amplitude values. For example, in the case of a 4-bit code, it is contemplated that the set of sixteen available phase and amplitude values would preferably be defined by at least four and as many as eight available phase values and at least two and as many as four non-zero amplitude values.

Figure 2:
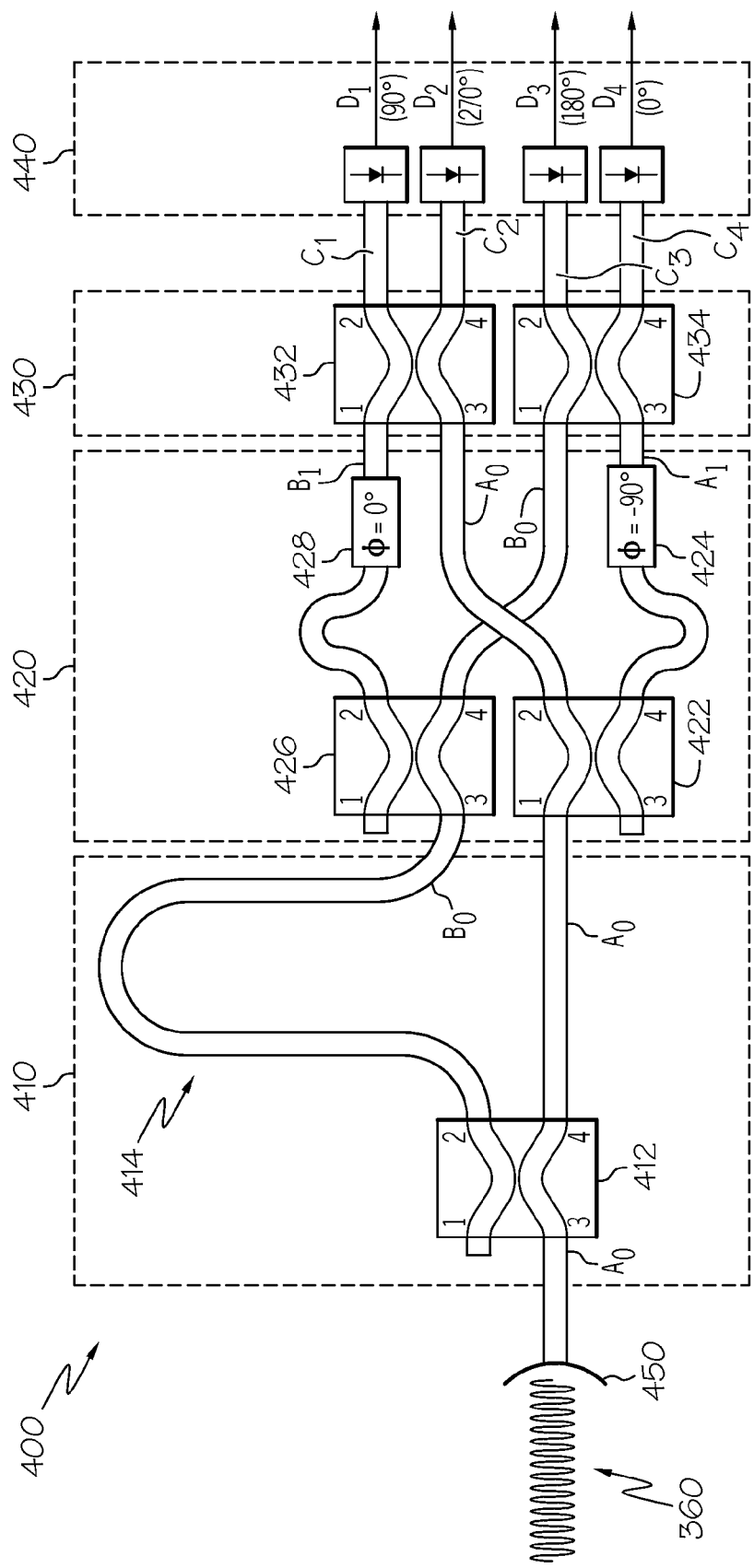
FIG. 2 is a schematic illustration of a receiver according to one embodiment of the present disclosure.

Referring now to FIG. 2, the receiver 400 may be operable to demodulate a PSK-modulated electrical MMW signal and may comprise a signal conditioning module 410, a phase-shifting module 420, and a discriminator module 430. The receiver 400 may additionally comprise a receiving antenna 450. A phase-modulated, wireless MMW signal 360 may be received by the receiving antenna 450, such as one transmitted by the systems described heretofore. The receiving antenna 450 may receive the wireless signal and convert it to an electrical signal (called the PSK-modulated, electric MMW signal) which may be conveniently represented by the symbol $A_0$.

The signal conditioning module 410 may comprise a first divider 412 and a symbol delay unit 414. The first divider 412 may be operable to divide $A_0$ into two substantially similar signals. The symbol delay unit 414 may be operable to delay $A_0$ by one symbol delay, wherein one symbol delay is defined as the amount of time allocated by the system for each data pattern encoded in $A_0$. This is typically about ten times the period of the carrier frequency. Thus, at 100 GHz, for example, one symbol delay may be about 100 ps. The $A_0$ signal delayed by one symbol delay is conveniently called $B_0$. Essentially, $A_0$ and $B_0$ represent the current and previous, respectively, "symbols" or data patterns encoded in the phase-shift-keying modulated, electrical MMW signal. For example, in a QPSK system, if the electrical MMW signal contained the data patterns "01" followed by "11," then $A_0$ would represent the modulated MMW signal encoded with the "11" (current) data, and $B_0$ would represent the modulated MMW signal encoded with the "01" (previous) data.

Figure 3B:
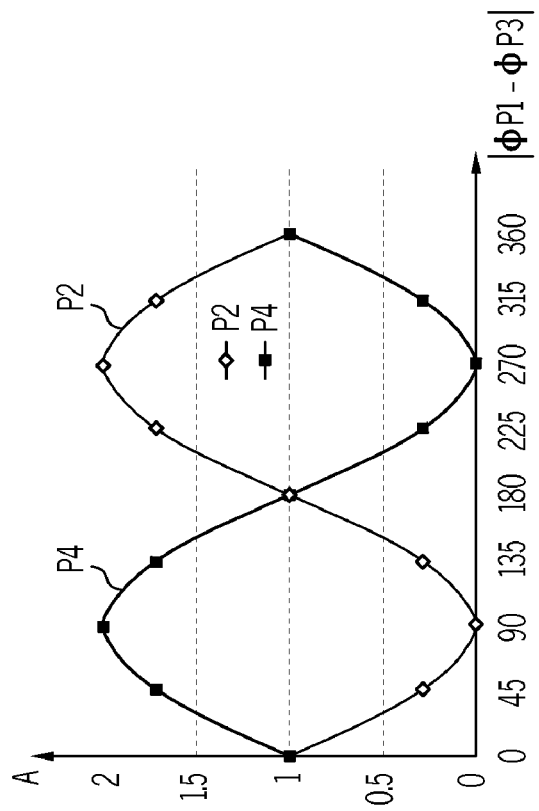
FIG. 3B depicts the input/output relationship of the directional coupler according to one embodiment of the present disclosure.
Figure 3A:
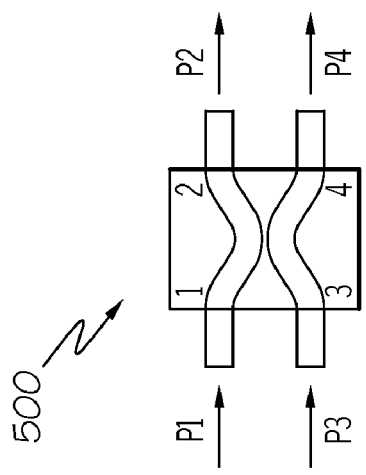
FIG. 3A is a schematic illustration of a directional coupler according to one embodiment of the present disclosure.

The first divider 412 may comprise a MMW direction coupler, which is sometimes called a hybrid coupler. One example of a directional coupler is the CSS Series Short Slot Hybrid Coupler manufactured by Millitech. The schematic of a typical directional coupler 500 is shown in FIG. 3A. There are two inputs, P1 and P3, and two outputs, P2 and P4. When only one input is used (and the other one is left open), two outputs of substantially equal amplitude are generated at P2 and P4: one output is not phase shifted with respect to the input, while the other output is phase shifted by $$-\frac{\pi}{2}$$

radians (−90 electrical degrees). If only the P1 input is used, then output P2 is not phase shifted while P4 is phase shifted by −90°. If only the P2 input is used, then output P4 is not phase shifted while P2 is phase shifted by −90°.

Referring again to embodiment of FIG. 2, the input to the symbol delay unit 414 is output P2 of the first divider 412. Since this output is phase shifted by −90°, $B_0$ would in theory be delayed by one symbol delay plus 90°. However, the symbol delay is typically about 40 times larger than the 90-degree phase shift introduced by the first divider 412. Consequently, the symbol delay unit 414 may be adjusted so as to compensate for the relatively small phase shift introduced by the first divider 412. Thus, $B_0$ may be still be delayed by approximately one symbol delay with respect to $A_0$. Alternatively, the first phase-delay unit 424 and/or second phase-delay unit 428 may be adjusted so as to compensate for any phase shift introduced into $B_0$ by the first divider 412. Other compensation techniques may be used as well.

The phase-shifting module 420 may comprise a second divider 422, a first phase-delay unit 424, a third divider 426, and a second phase-delay unit 428. The second divider 422 may comprise a MMW direction coupler and may be operable to divide $A_0$ into two substantially similar signals. One of these signals may be delayed radians $$-\frac{\pi}{2}$$

(−90 electrical degrees) by the second divider 422, as discussed previous herein. This same signal may be further delayed by the first phase-delay unit 424 so as to produce a phase-shifted version of $A_0$, called $A_1$. The amount of phase delay introduced by the first phase-delay unit 424 may be between zero and $2\pi$ radians (360 electrical degrees) of the electrical MMW signal. For example, if the receiver 400 is designed to demodulate a QPSK signal, then the first phase-delay unit 424 may introduce a 90-degree phase delay; when added to the 90-degree delay introduced by the second divider, the total delay may be 180 degrees. In this case, the phase-shifting module 420 may generate $A_0$ having a 1-degree phase shift, and $A_1$ having a 180-degree phase shift. Other amounts of phase shift (introduced by the second divider 422 or the first phase-delay unit 424) for $A_1$ are contemplated.

The third divider 426 may comprise a directional coupler and may be operable to divide $B_0$ into two substantially similar signals. One of these signals may be delayed 90 electrical degrees by the second divider 422, as discussed previous herein. This same signal may be further delayed by the second phase-delay unit 428 so as to produce a phase-shifted version of $B_0$, called $B_1$. The amount of phase delay introduced by the second phase-delay unit 428 may be between zero and $2\pi$ radians (360 electrical degrees) of the electrical MMW signal. For example, if the receiver 400 is designed to demodulate a QPSK signal, then the second phase-delay unit 428 may introduce a 0-degree phase delay; when added to the 90-degree delay introduced by the third divider, the total delay may be 90 degrees. In this case, the phase-shifting module 420 may generate $B_0$ having a 0-degree phase shift, and $B_1$ having a 90-degree phase shift. Other amounts of phase shift (introduced by the third divider 426 or the second phase-delay unit 428) for $B_1$ are contemplated.

Continuing to refer to FIG. 2, the discriminator module 430 may be operable to compare the relative phases of $A_0$ and $B_1$ and compare the relative phases of $B_0$ and $A_1$ and, based on the two comparisons, generate four outputs, each output being associated with one of the phases of the PSK-modulated millimeter-wave signal such that the relative amplitudes of the outputs corresponds to the phase of $A_0$ relative to $B_0$. In order to make these comparisons, the discriminator module 430 may comprise a first comparator 432 and a second comparator 434. These comparators may comprise, for example, MMW directional couplers as previously described herein and depicted in FIG. 3A. Unlike the dividers, however, the two comparators may use both inputs of the directional coupler in order to facilitate the comparisons. The input/output relationship for a directional coupler is depicted in FIG. 3B. For example, when the phases of both inputs are the same (i.e., P1 and P3), then both outputs (i.e., P2 and P4) have a relative amplitude of "1." When the phase difference between the input on P1 and the input on P3 is 90°, then the P2 output has a relative amplitude of "0," and the P4 output has a relative amplitude of "2."

Using this input/output relationship of the directional coupler, the discriminator module 430 may demodulate an exemplary QPSK signal having four phase states: 0°, 90°, 180°, and 270°. In this example, the first phase-delay unit 424 may introduce a 90-degree phase delay in $A_0$ such that $A_1$ is delayed 180 degrees total. Similarly, the second phase-delay unit 428 may introduce a 0-degree phase delay in $B_0$ such that $B_1$ is delayed 90 degrees total. The discriminator module 430 may generate four outputs which are representative of the phase data encoded in the electrical MMW signal. Table 2 shows the relative outputs as a function of the phase difference ($\Delta\phi$) between consecutive symbols (i.e., $A_0$ and $B_0$).

TABLE 2

| $\Delta\phi$ | $C_1$ (P2 of 432) | $C_2$ (P4 of 432) | $C_3$ (P2 of 434) | $C_4$ (P4 of 434) |
|---|---|---|---|---|
| 0° | 1 | 1 | 0 | 2 |
| 90° | 2 | 0 | 1 | 1 |
| 180° | 1 | 1 | 2 | 0 |
| 270° | 0 | 2 | 1 | 1 |

As can be seen from Table 2, for each phase change, only one of the four outputs has a relative amplitude of "2," while the remaining three outputs have a relative amplitude of either "0" or "1." In this fashion is the receiver 400 able to demodulate the PSK-modulated wireless MMW signal 360. Other arrangements of the components and/or different phase delays are contemplated. The receiver 400 described herein may not provide the actual phase of the symbol, but instead may provide the phase change from the symbol preceding it. Therefore, the data at the receiver may have to be synchronized using some form of header data string, for example. Once the data is synchronized, the receiver 400 just needs to keep track of the phase changes and the actual phase of the symbol (and thus the data) can be determined.

The receiver 400 may further comprise a detector module 440 operable to detect the relative amplitudes of the outputs of the discriminator module 430. The detector module 440 may comprise one or more millimeter-wave power detectors, such as a Schottky diode detector, in order to measure the amplitude of each of the outputs of the discriminator module 430. The detector module 440 may provide a binary output representing the data encoded in the PSK-modulated wireless MMW signal 360.

The components of the receiver 400 shown in FIG. 2 may be coupled via waveguides or other suitable means. If waveguides are used, the lengths of each particular waveguide may have to be adjusted so that no unwanted phase shift is introduced by the waveguide itself. For example, as shown in the phase-shifting module 420, the length waveguide disposed between P2 of the third divider 426 and the second phase-delay unit 428 may have to be increased. This is graphically shown in FIG. 2 as a "horseshoe-shaped" element. Other adjustments to the waveguides may be made as well, as is known in the art.

In an alternative embodiment, the receiver 400 of FIG. 2 may be configured to demodulate binary phase-shift keying (BPSK) encoded in an electrical MMW signal. In BPSK, the phase of the MMW signal may assume two distinct states, such as 0 radians (0 electrical degrees) and π radians (180 electrical degrees). Other phase states may be used as well, as is known in the art. In this embodiment, the signal conditioning module 410 may convert the PSK-modulated, electrical MMW signal, $A_0$, into a one-symbol-delayed signal, $B_0$, as previously discussed herein. The phase-shifting module 420 may delay either $A_0$ or $B_0$, so as to create either $A_1$ or $B_1$. Note that it may only be necessary to create one of these phase-delayed signals. The discriminator module 430 may comprise only one comparator 432, 434 which is configured to compare either $A_0$ and $B_1$, or compare $A_1$ and $B_0$. The result of this comparison may generate two outputs, each output being associated with one of the two phases of the BPSK MMW signal such that the relative amplitudes of the outputs corresponds to the phase of $A_0$ relative to $B_0$. As an example, a BPSK receiver may demodulate an exemplary BPSK signal having two phase states: 0° and 180°. In this example, $A_0$ may be delayed 90 electrical degrees to produce $A_1$, or $B_0$ may be delayed 90 electrical degrees to produce $B_1$. Table 3 shows the relative outputs as a function of the phase difference ($\Delta\phi$) between consecutive symbols (i.e., $A_0$ and $B_0$).

TABLE 3

| | Using only $A_0$ and $B_1$ | | Using only $A_1$ and $B_0$ | |
|---|---|---|---|---|
| $\Delta\phi$ | $C_1$ (P2 of 432) | $C_2$ (P4 of 432) | $C_3$ (P2 of 434) | $C_4$ (P4 of 434) |
| 0° | 0 | 2 | 0 | 2 |
| 180° | 2 | 0 | 2 | 0 |

It is contemplated that embodiments of the receiver 400 which compare only $A_0$ and $B_1$ (e.g., BPSK MMW signals) may dispense with the phase-shifting module 420 and incorporate any corresponding phase delay into the signal conditioning module 410. For example, if $B_0$ is delayed 90 electrical degrees to generate $B_1$, then this delay may be incorporated into the symbol delay unit 414 such that $B_1$ is delayed by one symbol plus 90 electrical degrees. This may be convenient to implement since the structure of the symbol delay unit 414 may only require minor changes.

Turning again to FIG. 1, as discussed herein, the system 100 may be operable to generate MMW signals which have quadrature amplitude modulation (QAM). In one embodiment, there may be two distinct amplitudes and four distinct phases (QPSK). In this case, the input data may comprise three binary digits having eight unique states. This may be encoded in the MMW signal as shown in FIG. 4.

TABLE 4

| Data | Phase | Amplitude |
|---|---|---|
| 000 | 0° | 0.5 |
| 001 | 90° | 0.5 |
| 010 | 180° | 0.5 |
| 011 | 270° | 0.5 |
| 100 | 0° | 1 |
| 101 | 90° | 1 |
| 110 | 180° | 1 |
| 111 | 270° | 1 |

It is noted that recitations herein of a component of the present disclosure being "configured" in a particular way, "configured" to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

The invention claimed is:

1. A system comprising a sideband generator, an optical filter, and a phase-shift-keying (PSK) modulator, wherein:
the sideband generator generates optical frequency sidebands about a carrier frequency of an optical signal from a laser source;
the optical filter discriminates between the optical frequency sidebands and the optical carrier frequency such that optical sidebands of interest can be used to generate an optical millimeter-wave signal;
the PSK modulator comprises an optical splitter, an optical phase delay unit, two or more optical gates, and an optical combiner;
the optical splitter divides the optical millimeter-wave signal into two or more intermediate signals;
the optical phase delay unit delays one or more of the intermediate signals such that each intermediate signal has a distinct phase relationship relative to the remaining intermediate signals;
the optical gates modulate each intermediate signal individually between a relatively high amplitude and a relatively low amplitude based on a control input; and
the optical combiner combines the gated intermediate signals into a single, PSK-modulated, optical millimeter-wave signal.

2. A system as claimed in claim 1 wherein the control input represents binary data having one or more binary digits.

3. A system as claimed in claim 1 wherein the optical splitter divides the optical millimeter-wave signal into four intermediate signals.

4. A system as claimed in claim 1 wherein the optical phase delay unit passively delays the intermediate signals by using a different optical path length for each intermediate signal.

5. A system as claimed in claim 1 wherein the optical phase delay unit delays one or more intermediate signals by multiples of $$\frac{1}{4f},$$

where f is the frequency of the optical millimeter-wave signal.

6. A system as claimed in claim 1 wherein each optical gate comprises an electrooptic device responsive to an electrical input signal that determines whether a corresponding intermediate signal has a relatively high or a relatively low amplitude.

7. A system as claimed in claim 1 wherein the optical combiner is a 4-to-1 combiner.

8. A system as claimed in claim 1 wherein:
the optical splitter divides the optical millimeter-wave signal into four intermediate signals;
the optical phase delay unit delays one or more of the intermediate signals such that the intermediate signals are approximately 90 electrical degrees out of phase with respect to the each other; and
the control input represents two binary digits having four distinct states.

9. A system as claimed in claim 8 wherein the frequency f of the optical millimeter-wave signal is approximately 94 Gigahertz and the optical phase delay unit delays one or more of the intermediate signals by a multiple of approximately 2.66 picoseconds.

10. A system as claimed in claim 1 further comprising an amplitude controller that generates an electrical drive signal to drive the sideband generator and adjust the amplitude of the optical millimeter-wave signal.

11. A system as claimed in claim 10 wherein the amplitude controller adjusts the amplitude of the optical millimeter-wave signal to two distinct states, based on the control input.

12. A system as claimed in claim 1 further comprising a gate generator circuit, wherein the gate generator circuit generates an electrical gate signal for each of the two or more optical gates such that no two intermediate signals are concurrently at the relatively high amplitude.

13. A system as claimed in claim 1 further comprising an optical/electrical converter, wherein the optical/electrical converter converts the PSK modulated, optical millimeter-wave signal to a phase-modulated, electrical millimeter-wave signal.

14. A system as claimed in claim 13 further comprising an antenna that receives and wirelessly transmits the PSK modulated, electrical millimeter-wave signal.

15. A system as claimed in claim 14 further comprising a receiver for demodulating the PSK-modulated, electrical millimeter-wave signal denoted as $A_0$, the receiver comprising a signal conditioning module, a phase-shifting module, and a discriminator module, wherein:
the transmitting antenna is operable to transmit the PSK-modulated, electrical millimeter-wave signal $A_0$ to the receiver;
the signal conditioning module receives the millimeter-wave signal $A_0$ and generates a delayed millimeter-wave signal $B_0$, such that the delay corresponds to a symbol delay of data encoded in the millimeter-wave signal;
the phase-shifting module shifts the phase of the millimeter-wave signal $A_0$ so as to produce a phase-shifted millimeter-wave signal $A_1$;
the phase-shifting module shifts the phase of the delayed millimeter-wave signal $B_0$ so as to produce a phase-shifted, delayed millimeter-wave signal $B_1$;
the discriminator module compares the phases of $A_0$ and $B_1$ and compares the phases of $B_0$ and $A_1$ and, based on the two comparisons, generates four outputs, each output being associated with one of the phases of the millimeter-wave signal such that the relative amplitudes of the outputs correspond to the phase of $A_0$ relative to the phase of $B_0$.

16. A system as claimed in claim 15, wherein the receiver further comprises a detector module that detects the amplitude of each output and generates four binary output signals, each binary output signal being associated with one output such that only one binary output signal is in the high state, depending on the relative amplitudes of the outputs.

17. A system as claimed in claim 1 further comprising a laser source that generates the optical signal.

\* \* \* \* \*